United States Patent Office
3,781,314
Patented Dec. 25, 1973

3,781,314
POLYENE COMPOUNDS

Werner Bollag, Basel, Norbert Rigassi, Arlesheim, and Ulrich Schwieter, Reinach, Switzerland, assignors to Hoffman-La Roche Inc., Nutley, N.J.
No Drawing. Filed July 14, 1971, Ser. No. 162,598
Int. Cl. C07c 3/02
U.S. Cl. 260—410.9                                   8 Claims

ABSTRACT OF THE DISCLOSURE

The compound 5,5-dimethyl-cyclopent-1-ene having an acetyl, hydroxyethyl or lower alkyl group in the 2-position and 3,7-dimethyl-nona-2,4,6,8-tetraenoic acid or tetraenol derivative in the 1-position useful as anti-tumor agents as well as a method for preparing these compounds from vitamin A acid derivatives.

SUMMARY OF THE INVENTION

In accordance with this invention, it has been found that compounds of the formula:

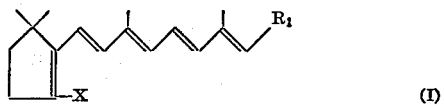

wherein X is acetyl, 1-hydroxyethyl, ethyl or methyl; and $R_1$ is hydroxymethylene, alkoxymethylene, aralkoxymethylene, alkanoyloxymethylene, aroyloxymethylene, carboxyl, alkoxycarbonyl, aralkoxycarbonyl, carbamoyl, mono(lower alkyl)-carbamoyl, di(lower alkyl)-carbamoyl or N-heterocyclylcarbonyl;

are useful as anti-tumor agent.

In accordance with this invention the compounds of Formula I are prepared via cyclizing a diketone of the formula:

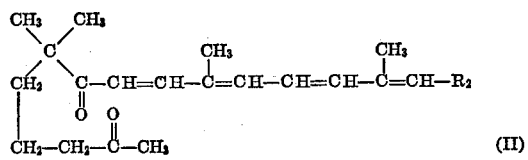

wherein $R_2$ is carboxyl, alkoxycarbonyl or aralkoxycarbonyl.

In accordance with another embodiment of this invention, the compound of Formula I is prepared by reacting a phosphonium salt of the formula:

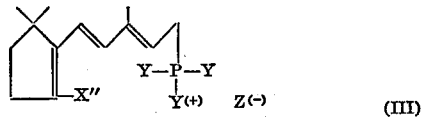

wherein X″ is methyl, ethyl, acetyl or acetyl wherein the oxo group is protected with a hydrolyzable ketal; Y is aryl or di(lower alkyl)amino; and Z is halogen or hydrosulfate ion;

with an aldehyde of the formula:

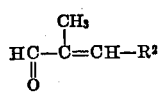

wherein $R^2$ is as above.

In accordance with another embodiment of this invention the compound of Formula II can be prepared by reacting an aldehyde of the formula:

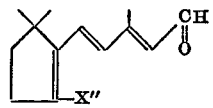

wherein X″ is as above;
with a phosphonium salt of the formula:

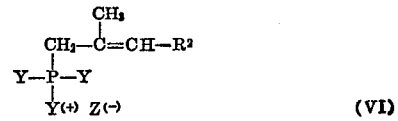

wherein Y, Z and $R^2$ are as above.

Where $R^2$ is a carboxyl group, the resulting compound of Formula I can be esterified or amidated. On the other hand, the carboxyl group, $R^2$ in the compound of Formula I, can, if desired, be reduced to a hydroxy group with the oxo group ketalized. After reduction, the oxo group can be regenerated by hydrolysis. The hydroxy group, can, if desired, be esterified or etherified.

When $R^2$ is an ester group, this ester group can, if desired, be hydrolyzed to a carboxyl group and the carboxyl group can, if desired, be amidated or esterified. On the other hand, the carbonyl group can, if desired, be reduced to the corresponding alcohol while protecting the oxo groups by ketalization. After reduction, the oxo group can be regenerated by hydrolysis and the alcohol group can, if desired, be etherified or esterified.

When X is an acetyl group, this acetyl group can, if desired, be reduced to the 1-hydroxyethyl group or to the ethyl group.

DETAILED DESCRIPTION

The term "halogen," as utilized in the instant specification, denotes all four halogens, i.e., chlorine, bromine, iodine and fluorine, with chlorine, bromine and iodine being preferred. Of the halogen ions denoted by Z in the compound of Formula III and the compound of Formula VI, the chloride, bromide and iodide ions are preferred. The term "lower alkyl" denotes both straight chain and branched chain lower alkyl groups containing from 1 to 6 carbon atoms such as methyl, ethyl, and isopropyl.

The term "alkoxy group" denotes alkoxy radicals containing from 1 to 20 carbon atoms. Generally preferred are the lower alkoxy groups which contain from 1 to 6 carbon atoms such as ethoxy, methoxy and isopropoxy. However, higher alkoxy groups containing from 7 to 20 carbon atoms such as cetyloxy are also included. The terms "alkoxymethylene" and "alkoxycarbonyl" designate alkoxymethylene and alkoxycarbonyl groups wherein alkoxy is defined as above. Among the preferred alkoxymethylene groups are included methoxymethylene, ethoxymethylene, isopropoxymethylene and cetyloxymethylene. Among the alkoxycarbonyl groups are included ethoxycarbonyl, methoxycarbonyl and isopropoxycarbonyl.

The term "aryl" preferably designates mono-nuclear aryl groups such as phenyl and substituted phenyl. Among the preferred substituted phenyl groups are included mono and lower dialkyl phenyl and lower alkoxy phenyl. Among the preferred aryl groups are included phenyl, tolyl, xylyl, mesityl and p-methoxyphenyl with phenyl being especially preferred. The term "aralkoxymethylene" and "aralkoxycarbonyl" include aralkoxymethylene and aralkoxycarbonyl groups wherein aryl is defined as above and the alkoxy group is a lower alkoxy group. Among the preferred aralkoxycarbonyl groups include benzyloxycarbonyl, phenethoxycarbonyl, etc., with benzyloxycarbonyl being preferred. Among the preferred aralkoxymethylene groups are included benzyloxymethylene, phenethoxymethylene, etc., with benzyloxymethylene being preferred.

The term "lower alkanoyloxy" designates derivatives of alkanecarboxylic acids containing from 2 to 20 carbon atoms. Among the preferred alkanoyloxy groups are included lower alkanoyloxy groups containing from 2 to 6 carbon atoms such as acetyloxy and propionyloxy. However, the alkanoyloxy group can be derived from higher alkane carboxylic acids, i.e., acids containing from 6 to 20 carbon atoms such as palmitic acid or stearic acid. The term "alkanoyloxymethylene" notes alkanoyloxymethylene groups wherein alkanoyloxy is defined as above. Among the preferred alkanoyloxymethylene groups are included acetyloxymethylene and propionyloxymethylene.

The term "aroyl" designates an aromatic carboxylic acid residue containing from 7 to 11 carbon atoms such as benzoic acid, toluic acid and xylylic acid. The term aroyloxymethylene designates aroyloxymethylene groups where aroyl is defined as above. Among the preferred aroyloxymethylene groups are included benzoyloxymethylene and tolyloxymethylene.

The terms "mono" and "di(lower alkyl)carbamoyl" denote mono and di(lower alkyl)carbamoyl radicals wherein lower alkyl is defined as above. Among the preferred mono or di(lower alkyl) carbamoyl groups are included such groups as N-methylcarbamoyl, N,N - dimethylcarbamoyl, N-isopropylcarbamoyl, and N-tertiarybutylcarbamoyl. The "N-heterocyclylcarbonyl" radicals are those which preferably contain a 5 or 6 membered heterocyclic ring, which in addition to the nitrogen atom may contain a further hetero atom selected from the group consisting of nitrogen, oxygen or sulfur. Examples of such N-heterocyclic groups which can be utilized in accordance with this invention are included pyridino, piperidino, morpholino, thiamorpholino and pyrrolidino.

In the compound of Formula III and Formula VI, the preferred di(lower alkyl)amino groups denoted by Y are those where the lower alkyl substituent contains from 1 to 4 carbon atoms. Among the preferred lower alkyl groups are included dimethyl amino, diethyl amino and diisopropyl amino.

The carbonyl of the acetyl group denoted X' can be protected by means of ketalization. Any alcohol which would form a ketal that can subsequently be hydrolyzed to regenerate the oxo group is suitable for this purpose. Exemplary alcohols for this purpose are lower alkylene diols such as ethyleneglycol, propyleneglycol, butyleneglycol; and arylene diols such as catechol and alkanols such as methanol and ethanol.

The term "ketal" as used herein, include both oxo ketals and thio ketals. Exemplary of the thio ketals are those formed by the reaction of the oxo group of the acetyl moiety with a thio alcohol such as thioethyleneglycol in the presence of a catalyst such as boro trifluoride etherate. The ketal is destroyed by desulfurization by treatment with Raney-nickel in boiling ethanol.

Among the preferred compounds of Formula I are included:

9-[2-acetyl-5,5-dimethyl-cyclopent-1-en-1-yl]-3,7-dimethyl-nona-2,4,6,8-tetraen-1-oic-acid;
9-[2-(1-hydroxyethyl)-5,5-dimethyl-cyclopent-1-en-yl]-3,7-dimethyl-nona-2,4,6,8-tetraen-1-oic acid;
9-[2-ethyl-5,5-dimethyl-cyclopent-1-en-1-yl]-3,7-dimethy-nona-2,4,6,8-tetraen-1-oic acid;
9-[2,5,5-trimethyl-cyclopent-1-en-1-yl]-3,7-dimethyl-nona-2,4,6,8-tetraen-1-oic acid;
9-[2-acetyl-5,5-dimethyl-cyclopent-1-en-1-yl]-,3,7-dimethyl-nona-2,4,6,8-tetraen-1-oic acid ethyl ester;
9-[2,5,5-trimethyl-cyclopent-1-en-1-yl]-3,7-dimethyl-nona-2,4,6,8-tetraen-1-oic acid ethyl ester;
9-[2-acetyl-5,5-dimethyl-cyclopent-1-en-1-yl]-3,7-dimethyl-nona-2,4,6,8-tetraen-1-oic acid ethyl amide;
9-[2-acetyl-5,5-dimethyl-cyclopent-1-en-1-yl]-3,7-dimethyl-nona-2,4,6,8-tetraen-1-ol;
9-[2,5,5-trimethyl-cyclopent-1-en-1-yl]-3,7-dimethyl-nona-2,4,6,8-tetraen-1-ol;
9-[2,5,5-trimethyl-cyclopent-1-en-1-yl]-3,7-dimethyl-nona-2,4,6,8-tetraen-1-oic acid ethyl amide;
9-[2,5,5-trimethyl-cyclopent-1-en-1-yl]-3,7-dimethyl-nona-2,4,6,8-tetraen-1-oic acid isobutyl amide;
1-methoxy-9-[2-acetyl-5,5-dimethyl-cyclopent-1-en-1-yl]-3,7-dimethyl-nona-2,4,6,8-tetraene;
1-benzyloxy-9-[2,5,5-trimethyl-cyclopent-1-en-1-yl]-3,7-dimethyl-nona-2,4,6,8-tetraene;
1-palmitoyloxy-9-[2-acetyl-5,5-dimethyl-cyclopent-1-en-1-yl]-3,7-dimethyl-nona-2,4,6,8-tetraene; and
1-benzoyloxy-9-[2,5,5-trimethyl-cyclopent-1-en-1-yl]-3,7-dimethyl-nona-2,4,6,8-tetraene.

The compounds of Formula I are pharmacodynamically valuable compounds. These compounds are effective for inhibiting tumors such as papillomas. For example, in the papilloma test, a compound 9-[2-acetyl-5,5-dimethyl-cyclopent-1-en-1-yl]-3,7-dimethyl - nona-2,4,6,8-tetraen-1-oic acid regressed tumors induced with dimethylbenzanthracene and croton oil. Within two weeks, the volume of papillomas in mice decreased by 40.3% on intraperitoneal application of 100 mg./kg./week of this compound and by 92.2% on intra-peritoneal administration of 200 mg./kg./week of this compound.

The toxicity of the polyene compounds of Formula I is slight. As will be evident from the delayed toxicity after 20 days set out in the following table, the acute toxicity [$LD_{50}$] in the mouse after intra-peritoneal administration in rape oil of 9-[2-acetyl-5,5-dimethyl-cyclopent-1-en-1-yl]-3,7-dimethyl-nona - 2,4,6,8 - tetraen-1-oic acid, for example, lies at 500 mg./kg.

TABLE

| After— | $LD_{10}$, mg./kg. | $LD_{50}$, mg./kg. | $LD^{80}$, mg./kg. |
|---|---|---|---|
| 1 day | 690 | 950 | 1,400 |
| 10 days | 580 | 700 | 890 |
| 12 days | 360 | 500 | 700 |

The compounds of Formula I are also useful as medicaments for the topical and systemic therapy of acne, psoriasis and other related dermatological disorders which are characterized by an increased or pathologically altered cornification. They can also be used to treat disorders which are characterized by inflammatory or degenerative alterations of the mucous membranes.

The polyene compounds of Formula I can accordingly be used as medicaments; for example, in the form of pharmaceutical preparations which contain them in association with a compatible pharmaceutical carrier. The pharmaceutical preparations serving for systemic application can, for example, be produced by adding a polyene compound of Formula I as the active ingredient to non-toxic, inert, solid or liquid carriers which are usual in such preparations. The pharmaceutical preparations can be administered enterally or parenterally. Suitable pharmaceutical preparations for enteral administration are, for example, tablets, capsules, dragées, syrups, suspensions, solutions and suppositories. Pharmaceutical preparations in the form of infusion or injection solutions are suitable for parenteral administration.

The dosages in which the polyene compounds of Formula I can be administered can vary according to the mode of administration and route of administration as well as according to the requirements of the patient.

The polyene compounds of Formula I can be administered in amounts of from 10 mg. to 1000 mg. daily in one or more dosages. Capsules with a content of a ca 20 mg. to ca 200 mg. of a polyene compound are a preferred form of presentation.

The pharmaceutical preparations can contain inert or other pharmacodynamically active additives. Tablets or granules, for example, can contain a series of binding agents, fillers, carrier materials or diluents. Liquid preparations can, for example, take the form of a sterile water-miscible solution. Besides the polyene compounds of Formula I, capsules can additionally contain a filling material or thickening agent. Furthermore, flavor-improving additives as well as the substances usually used as preserving, stabilizing, moisture-retaining or emulsifying agents, salts for varying the osmotic pressure, buffers and other additives can be present.

The carrier materials and diluents mentioned hereinbefore can be organic or inorganic substances; for example, water, gelatin, lactose, starches, magnesium stearate, talcum, gum arabic, polyalkyleneglycols and the like. It is of course a prerequisite that all adjuvants used in the production of the pharmaceutical preparations are non-toxic.

For topical administration, the polyene compounds of Formula I are expediently made up in the form of ointments, tinctures, creams, solutions, lotions, sprays, suspensions and the like. Ointments and creams, as well as solutions, are preferred. These pharmaceutical preparations intended for topical administration can be produced by mixing the polyene compounds as the active ingredient with non-toxic, inert solid or liquid carriers suitable for topical administration which are usual per se in such preparations.

Expedient for topical administration are ca 0.01% to ca 1% (preferably 0.03% to 0.3%) solutions as well as ca 0.01% to ca 1% (preferably ca 0.03% to ca 0.3%) ointments or creams.

An antioxidant (e.g. tocopherol, N-methyl-γ-tocopheramine, butylated hydroxyanisole or butylated hydroxytoluene) can optionally be added to the pharmaceutical preparations.

The diketones of Formula II can be prepared by oxidizing a vitamin A acid derivative of the formula:

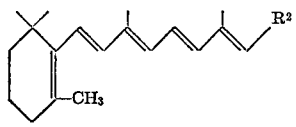

(VII)

wherein $R^2$ is as above.

The compound of Formula VII is converted to the compound of the Formula II with the aid of a strong oxidizing agent. Any strong oxidizing agent such as the chromium oxidizing agents can be utilized in carrying out this reaction. Generally, it is preferred to utilize chromosulfuric acid (chromium trioxide in aqueous sulfuric acid) as the oxidizing agent. Generally, this reaction can take place in the presence of an organic solvent. Any conventional inert organic solvent can be utilized in carrying out this reaction. Generally, it is preferred to utilize inert organic solvents such as acetone or tetrahydrofuran. In carrying out this reaction, temperatures and pressures are not critical and this reaction can be carried out at room temperature and atmospheric pressure. If desired, higher or lower temperatures can be utilized. Generally, it is preferred to utilize a temperature of from $-15°$ C. to $30°$ C. After oxidizing the compound of Formula VII, the compound of Formula II generally remains in the reaction medium after separating off crystalline by-products. The compound of Formula VII which is generally in the form of an oil can be purified by adsorption on Kieselgel or aluminum oxide [the preferred eluting agent being hexane/ethyl acetate (3:1 parts by volume)].

The compound of Formula II is converted to the compound of Formula I by cyclization in the presence of a base or acid. This cyclization occurs through dehydration. In carrying out this cyclization, any conventional acid or base can be utilized. Among the preferred bases are included, the alkali metal hydroxides such as sodium hydroxide or potassium hydroxide. Generally, a base such as an aqueous alcoholic sodium hydroxide is preferred. In carrying out this cyclization reaction with an acid, any conventional acid can be utilized. Among the preferred acids are the mineral acids such as perchloric acid and sulfuric acid. Other preferred acids are the strong organic acids such as the lower alkanoic acids which include formic acid, acetic acid, etc. Other strong organic acids such as p-toluene sulfonic acid and oxalic are also preferred. The cyclization can take place utilizing the acid or base as the reaction medium. If desired, an organic solvent can be utilized in carrying out this cyclization. Any conventional inert organic solvent can be utilized. Among the preferred inert organic solvents are included benzene, tetrahydrofuran, methylene chloride, with benzene being especially preferred. In carrying out this cyclization reaction, temperature and pressure are not critical and this reaction can be carried out at room temperature and atmospheric pressure. However, if desired, higher or lower temperatures can be utilized. Generally, this reaction is carried out at a temperature of from $25°$ C. to the reflux temperature of cyclization medium.

Where $R^2$ in the compound of Formula II is an alkoxycarbonyl or aryloxycarbonyl group, and cyclization is carried out in the presence of a base, saponification of the alkoxycarbonyl or aryloxycarbonyl group as well as cyclization occurs. Therefore, vitamin A acid esters are converted to 9 - [2-acetyl-5,5-dimethyl-cyclopent-1-en-1-yl]-3,7-dimethyl-nona-2,4,6,8-tetraen-1-oic acid. This resulting acid of the Formula I as well as the ester of the Formula I resulting from the acid cyclization are crystalline. The polyene compounds of Formula I can be purified by recrystallization, for example, from an alkanol (e.g., from methanol) or by absorption on Kieselgel or aluminum oxide. The preferred eluting agent is a mixture of hexane in ethyl acetate in the proportion of 1:1 parts by volume, where the compound of Formula I is an acid. In the case where the compound of Formula I is an ester, it is generally preferred to utilize a mixture of 3:1 parts by volume of hexane and ethyl acetate as the eluting agent.

The reaction between the compound of Formula III with a compound of Formula IV, and the reaction of a compound of the Formula V with a compound of Formula VI to produce a compound of the Formula I is carried out via a Wittig reaction. Any of the conditions conventional in carrying out a Wittig reaction can be utilized in carrying out these reactions. Generally, this reaction is carried out in the presence of an acid binding agent. Any conventional base or alkaline epoxide can be utilized as the acid binding agent in this reaction. Among the conventional bases which can be utilized in carrying out this reaction are the alkali metal hydroxides such as sodium hydroxide, potassium hydroxide, lithium hydroxide, etc., and the alkali metal alcoholates such as sodium methylate, etc. The base which is preferred for use as the acid binding agent is the alkali metal alcoholate, such as sodium methylate, potassium methylate, sodium ethylate, etc. Among the lower alkylene epoxides, ethylene oxide and 1,2-butyleneoxide are preferred. Generally, this reaction is carried out in the presence of an inert organic solvent. In carrying out this reaction, any conventional inert solvent can be utilized. Among the preferred solvents are dimethyl formamide and chlorinated hydrocarbons such as methylene chloride. In carrying out this reaction, temperature and pressure are not critical and this reaction can be carried out at room temperature and atmospheric pressure. However, if desired, higher or lower temperatures can be utilized. Generally, this reaction is carried out at a temperature of from about room temperature to the reflux temperature of the reaction medium.

The phosphonium salt starting materials of Formula III and the aldehyde starting materials of Formula V are novel and it will be appreciated that they form part of this invention.

The phosphonium salt starting materials of Formula III and the aldehyde starting materials of Formula V in which X' represents an acetyl group can, for example, be prepared in the following manner:

β-Ionone is converted into a 5-[2,6,6-trimethyl-cyclohex-1-en-1-yl-3-methyl-penta-2,4-dien-1-oic acid ester by treatment with alkoxy or aryloxy-carbonylmethylene - triphenylphosphorane in an organic solvent (e.g., benzene) at boiling temperatures. The 5-(2,6,6-trimethyl-cyclohex-1-en-1-yl)-3-methyl-penta-2,4-dien - 1 - oic acid ester is oxidized, in the manner described in connection with the compound of the Formula VII, to form the diketone, i.e., 3,7,7-trimethyl-6,11-dioxo-dodeca-2,4-dien - 1 - oic acid ester. This diketone is subsequently cyclized to the 5-[2-acetyl-5,5-dimethyl-cyclopent-1-en-1-yl] - 3 - methyl-penta-2,4-dien-1-oic acid ester by treatment with an acid or basic cyclization agent, for example, by treatment with perchloric acid in an organic solvent (e.g., ethanol) at a temperature between room temperature and the boiling point of the cyclization mixture. This cyclization can take place in the same manner described in connection with the cyclization of a compound of the Formula II.

The ester obtained by cyclization can be subsequently reduced to the corresponding alcohol, if desired, after previous saponification. Any conventional means of saponification can be utilized. Reduction -of the 5-[2 acetyl-5,5-dimethyl-cyclopent-1-en-1-yl] - methyl - penta-2,4-dien-1-oic acid or esters thereof is carried out by first protecting the keto group or the acetyl moiety by ketalization. This reduction is carried out utilizing a mixed metal hydride, especially lithium aluminum hydride in an organic solvent (e.g., diethyl ether or tetrahydrofuran) to form the 5-[2-acetyl-5,5-dimethyl-cyclopent-1-en-1-yl]-3-methyl-penta-2,4-dien-1-ol wherein the oxo group on the acetyl radical is ketalized. Any of the conditions conventionally utilized in reducing an acid to an alcohol with a mixed metal hydride can be utilized in this procedure.

The alcohol obtained can then be brominated to form 5-[2-acetyl-5,5-dimethyl-cyclopent - 1 - en-1-yl]-3-methyl-2,4-dienyl bromide where the oxo group in the acetyl radical can be ketalized. Any conventional means of brominating an alcohol can be utilized to effect this bromination. The bromide is then reacted with a triaryl phosphine or tri-[di(lower alkyl)amino]phosphine to form a phosphonium salt of Formula III. On the other hand, the phosponium salt of Formula III can be formed by reacting the alcohol directly with a triaryl phosphine or tri-[di(lower alkyl)amino] phosphonium halide or hydrosulfate. Any conventional method for reacting a phosphine with a halide or a phosphonium salt with an alcohol can be used in carrying out these reactions.

On the other hand, the 5-[2-acetyl-5,5-dimethyl-cyclopent-1-en-1-yl]-3-methyl-penta-2,4-dien-1-ol wherein the oxo group on the acetyl radical can be ketalized, is oxidized to form the aldehyde of Formula V. Any conventional method of oxidizing an alcohol to an aldehyde can be utilized to carry out this reaction. This reaction can be carried out, for example, by treating the alcohol with an oxidizing agent such as manganese dioxide in a conventional inert organic solvent such as methylene chloride. This reaction can take place at any temperature between 0° C. and the reflux temperature of the reaction medium.

Phosphonium salts of Formula III and aldehyde starting materials of Formula V which X' is methyl or an ethyl group can, for example, be prepared as follows starting from methyl ethyl ketone or diethyl ketone. Where X' is methyl, the starting ketone is methyl ethyl ketone. Where X' is ethyl, the starting ketone is diethyl ketone.

Methyl ethyl ketone, for example, is brominated. After ketalization of the 3-oxo group of the resulting 1-bromo-3-oxo-butane, the 1-bromo-3-ketalized oxo-butane is reacted with a triaryl phosphine or tri(diethyl-amino)phosphine to give the 3-ketalized oxo-butyl-(triaryl or diethyl-amino)-phosphonium bromide. The phosphonium salt is condensed with acetone under the conditions of a Wittig reaction to produce 2-ketalized oxo-5-methyl-hex-4-ene. The 2-ketalized oxo-5-methyl hex-4-ene obtained is deketalized in an acidic medium and the product converted by treatment with sodium acetylide in liquid ammonia into 3 - hydroxy-3,6-dimethyl-hepta-5-en-1-yne which is converted into the ketone, i.e., 6,9-dimethyl-deca-3,5,8-trien-1-one by treating with isopropenyl methyl ether followed by treatment with an aqueous-alcoholic sodium hydroxide solution as disclosed in U.S. Pat. No. 3,029,287, Marbet et al.

This ketone is subsequently cyclized to 4-[2,5,5-trimethyl-cyclopent-1-en-1-yl]-but-3-en-2 - one by the procedure given with regard to the cyclization of the compound of Formula II. Generally, it is preferred to carry out the cyclization by treatment with an acid, for example, by treatment with aqueous sulfuric acid. 4-[2,5,5-trimethyl-cyclopent-1-en-1-yl]-but-3-en-2 - one can then be converted in a manner known per se either into a phosphonium salt starting material of Formula III or into the aldehyde starting material of Formula V.

The phosphonium salt starting material of Formula III can be prepared from the 4-[2,5,5-trimethyl-cyclopent-1-en-1-yl]-but-3-en-2-one by reacting the ketone with acetylene, partially hydrogenating the 5-[2,5,5-trimethyl-cyclopent-1-en-1-yl]-3-hydroxy-3-methyl-penta - 4-en - 1 - yne formed, brominating with allyl rearrangement the 5-[2,5, 5-trimethyl-cyclopent - 1 - en - 1-yl]-3-hydroxy-3-methylpenta-1,4 - diene obtained and reacting the 5-[2,5,5-trimethyl-cyclopent-1-en-1-yl] - 3 - methyl-penta-2,4-dienyl bromide obtained with a triaryl-phosphine or tri(dialkyl amino)-phosphine to give the desired phosphonium salt starting material of Formula III.

The aldehyde starting materials of Formula V can be prepared from the 4-[2,5,5 - trimethyl-cyclopent-1-en-1-yl]-but-3-en-2-one obtained hereinbefore in the following manner:

The 4-[2,5,5 - trimethyl-cyclopent-1-en-1-yl]-but-3-en-2-one is reacted with alkoxy or aryloxy-carbonyl-methylene triarylphosphorane under the conditions of a Wittig reaction. The 5-[2,5,5-trimethyl-cyclopent-1-en-1-yl]-3-methyl-penta-2,4-dien-1-oic acid ester obtained is subsequently reduced in the cold by means of a mixed metal hydride, especially lithium aluminum hydride, in an organic solvent (e.g., diethyl ether or tetrahydrofuran) to 5-[2,5,5-trimethyl-cyclopent-1-en-1-yl] - 3 - methylpenta-2,4-dien-1-ol. The alcohol is oxidized to the desired 5-[2,5,5-trimethyl-cyclopent-1-en-1-yl] - 3 - methyl-penta-2,4-dien-1-al of Formula V by treatment with an oxidizing agent, for example, with magnesium dioxide, in an organic solvent such as acetone or methylene chloride at a temperature between 0° C. and the boiling point of the mixture.

Where $R_1$ in the compound of Formula I is carboxyl, this compound can be converted to a compound of the formula:

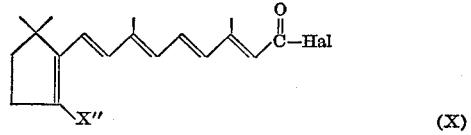

(X)

wherein X" is as above; and Hal is a halogen.

This reaction is carried out by treating the compound of Formula I with a halogenating agent. Any conventional halogenating agent for halogenating organic acids can be utilized in this procedure. Furthermore, any of the conditions conventional in halogenating organic acids can be utilized in carrying out this reaction. Generally, it is preferred to utilize a chlorinating agent such as thionyl chloride in the presence of pyridine.

The acid chloride of Formula X can be converted into the compound of Formula I where $R_1$ is a mono(lower alkyl)carbamoyl, di(lower alkyl)carbamoyl or N-heterocyclic carbonyl group by reacting the acid chloride of Formula X with a mono or di(lower alkyl) substituted amine or a heterocyclic amine. Any of the conditions conventional in reacting amines with acid chlorides to form amides can be utilized in carrying out this reaction. The acid chloride can also be converted into the compound of Formula I where $R_1$ is a carbamoyl group by reacting the chloride of Formula X with ammonia. Any of the conditions conventional in treating ammonia with an acid chloride to form an amide can be utilized in this process.

The acid chloride of Formula X can also be converted into a compound of Formula I where $R_1$ is an alkoxycarbonyl or an aralkoxycarbonyl group by reacting with an aliphatic or aromatic alcohol. Any conventional means of esterifying an acid chloride with an aliphatic or aromatic alcohol can be utilized in carrying out this conversion.

The compound of Formula I where $R_1$ is an alkoxycarbonyl or aralkoxycarbonyl group can be converted to the corresponding compound where $R_1$ is a mono or di (lower alkyl)carbamoyl or N-heterocyclic carbamoyl. Any of the conventional methods of converting an ester into the corresponding acid amide can be utilized in carrying out this procedure. The preferred method for carrying out this procedure by treating the compound of Formula I where $R_1$ is aralkoxycarbonyl or alkoxycarbonyl with dialkyl amine-lithium. The dialkyl amine-lithium required for this treatment can be prepared by dissolving a dialkyl amine such as diethyl amine in an organic solvent such as diethyl ether. The solution can then be mixed at a temperature of from $-10$ to $-20°$ C. with a solution of butyl lithium in an organic solvent such as hexane or tetrahydrofuran. The mixture can then be reacted at room temperature. The dialkyl amine lithium obtained can be advantageously reacted with the ester of Formula I at room temperature.

Where $R_1$ in the compound of Formula I is a carboxyl group, this group can be converted into a hydroxymethylene, alkoxymethylene, alkanoyloxymethylene, or aroyloxymethylene group by first reducing the acid of Formula I to the corresponding alcohol. In carrying out this reaction, any conventional means of reducing acid to an alcohol can be utilized. Where X is acetyl, it is preferred to protect the oxo group on the acetyl by converting the oxo group to a ketal prior to reduction. The reduction is preferably carried out by utilizing a reducing agent such as a metal hydride or an alkyl metal hydride. Generally, this reaction is carried out in an inert organic solvent. Mixed metal hydrides such as lithium aluminum hydride, diisobutyl aluminum hydride or bis(methoxy-ethyleneoxy) sodium aluminum hydride can also be utilized as the reducing agent in this process. The reducing agents which are particularly preferred are the alkyl metal hydrides and the mixed metal hydrides such as diisobutyl aluminum hydride and bis(methoxy-ethyleneoxy)sodium aluminum hydride. This reaction can be carried out in an inert organic solvent. Any conventional inert organic solvent can be utilized in carrying out this reaction. Generally, it is preferred to utilize such solvents as diethyl ether, tetrahydrofuran or dioxane when lithium aluminum hydride is used as the reducing agent. On the other hand, when diisobutylaluminum hydride or bis(methoxy-ethyleneoxy) sodium aluminum hydride is used as the reducing agent, the preferred solvents are diethyl ether, hexane, benzene and toluene.

Where $R_1$ in the compound of Formula I is an aralkoxycarbonyl or alkoxycarbonyl group, this ester can be hydrolyzed to the compound of Formula I where $R_1$ is a carboxyl group. Any conventional means of hydrolysis can be utilized to carry out this step. Generally, it is preferred to carry out this hydrolysis utilizing an alkali such as aqueous alcoholic sodium or potassium hydroxide, at a temperature of from room temperature to the reflux temperature of the reaction mixture. This acid can be amidated either via an acid halide or directly as described hereinbefore to form the compound of Formula I where $R_1$ is a carbamoyl, mono(lower alkyl) carbamoyl, di(lower alkyl)carbamoyl and N-heterocyclic carbonyl group. On the other hand, this acid may be reduced in the manner hereinbefore described to form the compound of Formula I where $R_1$ is a hydroxymethylene group.

The compound of Formula I where $R_1$ is a hydroxymethylene group, can be etherified with an alkyl halide to form the compound of Formula I where $R_1$ is an alkoxymethylene group. Any conventional method of etherifying an alcohol can be utilized to carry out this reaction. Generally, it is preferred to carry out this reaction by treating the alcohol with an alkyl halide such as ethyl iodide in the presence of a base, preferably sodium hydroxide. This reaction can take place in an inorganic solvent such as dioxane, tetrahydrofuran, 1,2-dimethoxy ethane or dimethyl formamide. On the other hand, the etherification can take place in the presence of an alkali metal alcoholate such as sodium methylate in a lower alkanol at a temperature of from $0°$ C. to room temperature. The compound of Formula I where $R_1$ is a hydroxymethylene group can be converted to the corresponding compound of Formula I where $R_1$ is an alkanoyloxymethylene or aroyloxymethylene by esterification. Any conventional method of esterifying an alcohol can be utilized to carry out this procedure. Generally, it is preferred to carry out this with an alkanoyl halide or an aroyl halide or an anhydride in the presence of a base. The bases which are generally preferred are pyridine and triethylamine. This reaction is carried out at a temperature of from room temperature to the reflux temperature of the reaction mixture.

The compound of Formula I wherein X is an acetyl group can be reduced to a compound of Formula I in which X is a 1-hydroxyethyl group by treating the compound with a hydride reducing agent. Among the conventional hydride reducing agents, borohydride reducing agents are particularly preferred. This reduction is expediently carried out utilizing alkali metal borohydride, preferably sodium borohydride in a lower alkanol such as methanol at a temperature of from room temperature to the reflux temperature of the reaction mixture.

Where X in the compound of Formula I is an acetyl group, this compound can be reduced to the corresponding compound where X is an ethyl group by utilizing the Clemmensen reduction. Generally, this reduction is carried out by use of amalgamated zinc and hydrochloric acid as the reducing agent. Any of the conditions conventionally utilized in carrying out a Clemmensen reduction can be utilized in carrying out this reaction.

The following examples are illustrative, but not limitative, of the present invention. In the examples the term "70 percent perchloric acid" indicates 70 percent by weight perchloric acid. The term "concentrated sulfuric acid" in the examples designates an aqueous solution containing 96 percent by weight sulfuric acid. The term "dilute sulfuric acid" designates an aqueous solution containing 30 percent by weight sulfuric acid. The ether utilized in these examples is diethyl ether.

EXAMPLE 1

280 g. of vitamin A acid ethyl ester are dissolved in 2000 ml. of acetone and, with stirring, treated at $0°$ C. to $5°$ C. with 1100 ml. of a solution of 267.2 g. of chromium trioxide and 230 ml. of concentrated sulphuric acid in 1000 ml. of water. The mixture is stirred at $5°$ C. for 0.5 hour, then treated with 5000 ml. of water and exhaustively extracted with diethyl ether. The ether phase is washed neutral with a saturated aqueous sodium chloride solution, dried over sodium sulphate and evaporated under reduced pressure. The semi-crystalline residue is taken up in 750 ml. of methanol, thoroughly stirred and filtered. The 3,7,11,11-tetramethyl-10,15-dioxo-hexadeca-2,4,6,8-tetraen-oic acid ethyl ester remaining behind after evaporation of the filtrate can be purified by adsorption on Kieselgel [eluting agent:hexane/ethyl acetate (4:1 parts by volume)]. Absorption maximum (rectified spirit): 353 and 368 nm.

$$(E_{1cm}^{1\%} = 1470 \text{ and } 1355)$$

EXAMPLE 2

33.5 g. of 3,7,11,11-tetramethyl-10,15-dioxo-hexadeca-2,4,6,8-tetraen-1-oic acid ethyl ester are dissolved in 1000 ml. of ethanol and stirred at 50° C. for 16 hours with 13.5 ml. of 70 percent perchloric acid. The mixture is concentrated under reduced pressure, poured into a mixture of ice-water and sodium bicarbonate and exhaustively extracted with diethyl ether. The ether extract is washed neutral, dried and evaporated under reduced pressure. The residual dark-yellow oil (31.5 g.) is purified by adsorption on a 60 fold amount of Kieselgel [eluting agent: hexane/ethyl acetate (3:1 parts by volume)]. The 9 - (2 - acetyl - 5,5-dimethyl-cyclopent-1-en-1-yl)-3,7-dimethyl-nona-2,4,6,8-tetraen-1-oic ethyl ester is obtained in the form of yellow crystals and melts at 100° C. after recrystallization from hexane. Adsorption maximum (rectified spirit): 386 nm.

$$(E_{1cm}^{1\%} = 1680)$$

EXAMPLE 3

17 g. of 9-(2-acetyl-5,5-dimethyl-cyclopent-1-en-1-yl)-3,7-dimethyl-nona-2,4,6,8-tetraen-1-oic acid ethyl ester are dissolved in 300 ml. of ethanol and stirred for 1 hour at 60° C. (bath temperature) with 17 g. of potassium hydrxide. The mixture is poured into ice-water and extracted with ether. The aqueous phase is made slightly acidic with 3 N aqueous sulphuric acid and exhaustively extracted with diethyl ether. This latter ether phase is washed neutral, dried and evaporated under reduced pressure. After recrystallization from methanol or hexane-tetrahydrofuran, the residual 9-(2-acetyl-5,5-dimethyl-cyclopent - 1 - en-1-yl)-3,7-dimethyl-nona-2,4,6,8-tetraen-1-oic acid melts at 196°–198° C. Adsorption maximum (rectified spirit): 384 nm.

$$(E_{1cm}^{1\%} = 1700)$$

EXAMPLE 4

2 g. of 3,7,11,11-tetramethyl-10,15-dioxo-hexadeca-2,4-6,8-tetraen-1-oic acid ethyl ester are stirred in 100 ml. of benzene with 100 mg. of p-toluenesulphonic acid for 24 hours at room temperature. After dilution with diethyl ether, the mixture is washed with aqueous solution containing percent by weight sodium bicarbonate and subsequently with water, dried over sodium sulphate and evaporated under reduced pressure. The residual dark-yellow oil (1.8 g.) can be purified as described in Example 2. The 9-(2-acetyl-5,5-dimethyl-cyclopent-1-en-1-yl)-3,7-dimethylnona ˙2,4,6,8-tetraen-1-oic acid ethyl ester obtained melts at 100° C. after recrystallization from hexane. Absorption maximum (rectified spirit): 386 nm.

$$(E_{1cm}^{1\%} = 1680)$$

EXAMPLE 5

10 g. of 3,7,11,11-tetramethyl-10,15-dioxo-hexadeca-2,4,6,8-tetraen-1-oic acid ethyl ester are dissolved in 1000 ml. of isopropanol and, after the addition of 1 ml. of concentrated sulphuric acid, stirred at room temperature for 12 hours. The working up is carried out in an analogous manner to that described for the mixture in Example 2. The 9-(2-acetyl-5,5-dimethyl-cyclopent-1-en-1-yl)-3,7-dimethyl-nona-2,4,6,8-tetraen-1-oic acid ethyl ester obtained melts at 100° C. after recrystallization from hexane.

EXAMPLE 6

5 g. of 3,7,11,11-tetramethyl - 10,15 - dioxo-hexadeca-2,4,6,8-tetraen-1-oic acid ethyl ester are heated to boiling under reflux conditions for 1 hour with 7 g. of potassium hydroxide in 750 ml. of ethanol. The cooled mixture is poured into water and extracted with diethyl ether. The aqueous phase is made slightly acidic with 3 N aqueous sulphuric acid and exhaustively extracted with diethyl ether. This latter ether phase is washed neutral, dried and evaporated under reduced pressure. The 9-(2-acetyl-5,5-dimethyl - cyclopent - 1 - en-1-yl)-3,7-dimethyl-nona-2,4, 6,8-tetraen-1-oic acid (3 g.) obtained melts at 197° C. after recrystallization from methanol.

EXAMPLE 7

3 g. of sodium hydroxide are heated to 70° C. in 250 ml. of tetrahydrofuran and 50 ml. of water and treated with 3 g. of 3,7,11,11-tetramethyl-10,15-dioxo-hexadeca-2,4,6,8,-tetraen-1-oic acid ethyl ester in 10 ml. of tetrahydrofuran. The mixture is heated to boiling under reflux conditions for 4 hours. The product is worked up as described for the cooled mixture in Example 6. The 9 - (2 - acetyl - 5,5 - dimethyl-cyclopent-1-en-1-yl)-3,7-dimethyl-nona-2,4,6,8-tetraen-1-oic acid obtained melts at 198° C. after recrystallization from methanol.

EXAMPLE 8

170 g. of β-ionone are dissolved in 2 liters of benzene and heated to boiling under reflux conditions for 24 hours with 340 g. of carbethoxymethylene-triphenylphosphorane and 68 g. of benzoic acid. The mixture is poured into ice-water and diluted with diethyl ether. The organic phase is washed with aqueous solution of sodium bicarbonate and water, dried and evaporated under reduced pressure. The residual crude 5-(2,6,6-trimethyl-cyclohex-1-en-1-yl)-3-methyl-penta-2,4-dien-1-oic acid ethyl ester is purified by adsorption on a 40-fold amount of Kieselgel [eluting agent: hexane/ethyl acetate (99:1 parts by volume)]. Boiling point 84°–86° C./0.003 mm. Hg.

EXAMPLE 9

60 g. of 5-(2,6,6-trimethyl-cyclohex-1-en-1-yl)-3-methyl-penta-2,4-dien-1-oic acid ethyl ester are dissolved in 2.5 liters of acetone and treated at 0° C. with 450 ml. of a chromium trioxide/sulphuric acid solution [26.72 g. of chromium trioxide, 24 ml. of concentrated sulphuric acid, water to 100 ml.] and stirred for 2 hours without cooling. The mixture is thereafter poured into a mixture of ice-water and sodium bicarbonate and exhaustively extracted with diethyl ether. The ether extract is washed neutral with water, dried and evaporated under reduced pressure. The residual crude 3,7,7-trimethyl-6,11-dioxo-dodeca-2,4-dien-1-oic acid ethyl ester is purified by adsorption on 4 kg. of Kieselgel [eluting agent: hexane/ethyl acetate (2:1 parts by volume)]. After recrystallization from hexane, the pure ester melts at 58.5° C.

EXAMPLE 10

39.5 g. of 3,7,7-trimethyl-6,11-dioxo-dodeca-2,4-dien-1-oic acid ethyl ester are dissolved in 1350 ml. of absolute ethanol and treated with 52 ml. of 70 percent perchloric acid. The mixture is stirred at 60° C. for 20 hours, thereafter concentrated under reduced pressure, poured into a mixture of ice-water and sodium bicarbonate and extracted with diethyl ether. The ether phase is washed neutral dried and evaporated under reduced pressure. The crude 5-(2-acetyl-5,5-dimethyl-cyclopent-1-en-1-yl)-3-methyl-penta-2,4-dien-1-oic acid ethyl ester is purified by adsorption on a 50-fold amount of Kieselgel [eluting agent: hexane/ethyl acetate (2:1 parts by volume)]. Boiling point 125° C./0.02 mm. Hg.

EXAMPLE 11

54 g. of 5-(2-acetyl-5,5-dimethyl-cyclopent-1-en-1-yl)-3-methyl penta-2,4-dien-1-oic acid ethyl ester are dissolved in 2000 ml. of benzene and, after the addition of 150 ml. of methylene glycol and 200 mg. of p-toluenesulphonic acid, heated to boiling under reflux conditions with the aid of a water separator. The product is thereafter poured into a mixture of ice-water and saturated aqueous sodium bicarbonate solution and extracted with diethyl ether. The ether phase is washed neutral with water, dried and evaporated under reduced pressure to produce 5-[2-(1-ethylenedioxyethyl) - 5,5 - dimethyl-cyclopent-1-en-1-yl]-3-methyl-penta-2,4-dien-1-oic acid ethyl ester.

EXAMPLE 12

6.4 g. of 5-[2-(1-ethylenedioxyethyl) - 5,5 - dimethyl-cyclopent-1-en-1-yl] - 3-methyl-penta-2,4-dien-1-oic acid ethyl ester are dissolved in 50 ml. of tetrahyrdofuran and treated at 10° C. with 0.6 g. of lithium aluminum hydride in 50 ml. of absolute tetrahydrofuran. The mixture is subsequently stirred at 10° C. for 2 hours, thereafter cautiously treated with ethyl acetate and subsequently with water and diluted with diethyl ether. The organic phase is washed neutral, dried and evaporated under reduced pressure. The crude 5-[2-(1-ethylenedioxyethyl)-5,5-dimethyl-cyclopent-1-en-1-yl] - 3 - methyl-penta-2,4-dien-1-ol is purified by adsorption on a 60-fold amount of aluminum oxide [basic, activity grade III] [eluting agent: hexane/ethyl acetate (3:1 parts by volume)].

EXAMPLE 13

20 g. of 5-[2-(1-ethylenedioxyethyl) - 5,5 - dimethyl-cyclopent-1-en-1-yl]-3-methyl-penta-2,4-dien-1-ol are dissolved in 700 ml. of methylene chloride and shaken at room temperature for 16 hours with 100 g. of manganese dioxide. The mixture is filtered and evaporated under reduced pressure. The crude 5-{2-(1-ethylenedioxyethyl)-5,5-dimethyl-cyclopent-1-en-1-yl] - 3 - methyl-penta-2,4-dien-1-al is purified by adsorption on a 40-fold amount of aluminum oxide [basic, activity grade III] [eluting agent: hexane/ethyl acetate (4:1 parts by volume)].

EXAMPLE 14

27.6 g. of 5 - [2-(1-ethylenedioxyethyl)-5,5-dimethyl-cyclopent-1-en-1-yl]-3-methyl-penta-2,4-dien-1-al, 24 g. of 4-chloro-3-methyl-crotonic acid ethyl ester, 39 g. of triphenylphosphine and 150 ml. of 1,2-butylene oxide are heated to 90° C. for 24 hours with shaking in a pressure vessel. The reaction mixture is subsequently evaporated to dryness. The residue is treated with 500 ml. of hexane. The triphenylphosphine oxide which precipitates is filtered off. The filtrate is evaporated. The residue is dissolved in 200 ml. of acetate and, after the addition of 40 ml. of 1 N sulphuric acid, stirred at room temperature for 2 hours. The sulphuric acid containing mixture is poured into a mixture of ice-water and sodium bicarbonate and exhaustively extracted with diethyl ether. The ether extract is washed, dried and evaporated under reduced pressure. The residual crude 9-(2-acetyl-5,5-dimethyl-cyclopent-1-en-1-yl)-3,7-dimethyl-nona-2,4,6,8-tetraen-1-oic acid ethyl ester is purified by adsorption on a 40-fold amount of Kieselgel [eluting agent: hexane/ethyl acetate (3:1 parts by volume)]. Melting point 101° C.

EXAMPLE 15

6.7 g. of (3 - carbethoxy - 2 - methyl - prop - 2 - en-yl)-triphenylphosphonium chloride are dissolved in 20 ml. of absolute alcohol and, with intensive stirring, introduced into a solution of 0.25 g. of sodium in 10 ml. of absolute alcohol. After 5 minutes, the dark-yellow solution is rapidly treated with a solution of 2.8 g. of 5-[2-(1-ethylenedioxyethyl)-5,5-dimethyl-cyclopent - 1 - en-1-yl]-3-methyl-penta-2,4-dien-1-al in 5 ml. of absolute alcohol, stirred at room temperature for 4 hours and subsequently concentrated under reduced pressure. The residue is diluted with water and extracted with diethyl ether. The ether phase is washed neutral with water, dried and evaporated under reduced pressure. The residue is dissolved in 25 ml. of acetone and, after the addition of 6 ml. of 1 N aqueous sulphuric acid, stirred at room temperature for 2.5 hours. The mixture is poured into a mixture of ice-water and a saturated aqueous bicarbonate solution and exhaustively extracted with diethyl ether. The ether phase is washed, dried and evaporated under reduced pressure. The residual crude 9-(2-acetyl-5,5-dimethyl-cyclopent-1-en-1-yl) - 3,7 - dimethyl-nona-2,4,6,8-tetraen-1-oic acid ethyl ester can be purified by adsorption on a 40-fold amount of Kieselgel [eluting agent: hexane/ethyl acetate (3:1 parts by volume)]. Melting point 100° C.

EXAMPLE 16

5.6 g. of 5-[2-(1-ethylenedioxyethyl) - 5,5 - dimethyl-cyclopent-1-en-1-yl]-3-methyl-penta-2,4-dien-1-ol are dissolved in 30 ml. of dimethylformamide and, after the addition of 8.8 g. of triphenylphosphonium bromide, stirred at room temperature for 16 hours. The mixture is evaporated to dryness. The residue is crystallized from ethyl acetate/methanol to produce [5-[2-(1-ethylenedioxyethyl)-5,5-dimethyl-cyclopent - 1 - en-1-yl]-3-methyl-penta-2,4-dien-1-yl]-triphenylphosphonium bromide.

EXAMPLE 17

7.2 g. of [5-[2-(1-ethylenedioxyethyl)-5,5-dimethyl-cyclopent-1-en-1-yl]-3-methyl-penta-2,4-dien-1-yl] - triphenylphosphonium bromide, 1.7 g. of 2-formyl-crotonic acid butyl ester and 50 ml. of 1,2-butylene oxide are heated to 75° C. in a pressure vessel for 16 hours. The reaction solution is subsequently evaporated to dryness. The residue is taken up in 100 ml. of hexane. The triphenylphosphine oxide which precipitates is filtered off. The filtrate is evaporated under reduced pressure. The residue is dissolved in 35 ml. of acetone and, after the addition of 8 ml. of 1 N aqueous sulphuric acid, stirred at room temperature for 2 hours. The mixture is thereafter worked up as is the sulphuric acid containing mixture as in Example 14. The 9-(2-acetyl-5,5-dimethyl-cyclopent-1-en-1-yl)-3,7-dimethyl-nona-2,4,6,8-tetraen-1-oic acid butyl ester obtained is a viscous yellow oil.

EXAMPLE 18

5.6 g. of 5-[2-(1-ethylenedioxyethyl)-5,5-dimethyl-cyclopent - 1 - en - 1 - yl]-3-methyl-penta-2,4-dien-1-ol are dissolved in 30 ml. of dimethylformamide and, after the addition of 8.8 g. of triphenylphosphonium bromide, stirred at room temperature for 16 hours. 2.5 g. of 2-formyl-crotonic acid ethyl ester in 5 ml. of dimethylformamide and 0.36 g. of sodium in 10 ml. of absolute ethanol are thereafter simultaneously added dropwise to the mixture from separate supply vessels. In so doing, the solution is held at 0° C. and subsequently stirred for a further 2 hours at 0° C. and for 2 hours at room temperature. The mixture is worked up as is the reaction mixture in Example 14. The product is deketalized and purified as described earlier. The 9-(2-acetyl-5,5-dimethyl-cyclopent-1-en-1-yl) - 3,7 - dimethyl-nona-2,4,6,8-tetraen-1-oic acid ethyl ester obtained melts at 100° C. after recrystallization from hexane.

EXAMPLE 19

19.5 g. of 1-bromo-3-ethylenedioxy-butane and 26.2 g. of triphenylphosphine in 150 ml. of absolute benzene are stirred at a bath temperature of 40° C. for 18 hours. The resulting mixture is evaporated to dryness. After the addition of 200 ml. of acetone, the residue is cooled, with stirring, at 0° C. and treated with sufficient methylene chloride for a clear solution to be formed at 0° C. The solution is treated dropwise with cooling with a solution of 3 g. of sodium in absolute ethanol and the resulting mixture is stirred for 6 hours in a melting bath, treated with 100 ml. of water and 20 ml. of concentrated aqueous sulphuric acid, stirred at 40° C. for 4 hours, diluted with water and exhaustively extracted with diethyl ether. The ethereal extract is washed with sodium bicarbonate solution and to neutrality with water, dried and evaporated. The residue is purified by adsorption on the 40-fold amount of silica gel [eluting agent: hexane/ethyl acetate (99:1 parts by volume)] to yield 5-methyl-hex-4-en-2-one as a colorless oil.

EXAMPLE 20

1.5 g. of lithium are dissolved in 150 ml. of liquid ammonia and acetylene is conducted into the blue-colored solution until a whitish-grey, milky suspension is obtained. 10 g. of 5-methyl-hex-4-en-2-one in 80 ml. of absolute tetrahydrofuran are slowly added dropwise to the suspension and the resulting mixture is stirred for 16 hours while the ammonia slowly evaporates, then is heated with a saturated aqueous solution of sodium acetate, diluted with water and exhaustively extracted with diethyl ether. The ethereal extract is washed neutral, dried and cautiously evaporated under reduced pressure. The 3-hydroxy-3,6-dimethyl-hept-5-en-1-yne obtained is purified by adsorption on a 50-fold amount of silica gel [eluting agent: hexane/ethyl acetate (98.2 parts by wolume)] to yield 3-hydroxy-3,6-dimethyl-hept-5-en-1-yne as an almost colorless oil.

EXAMPLE 21

28 g. of 3-hydroxy-3,6-dimethyl-hept-5-en-1-yne, 50 g. of isopropenyl methyl ether, 200 ml. of high-boiling petroleum ether and 100 mg. of p-toluenesulphonic acid are stirred at 80° C. for 16 hours, then the mixture obtained is cooled to 0° C., treated with 2 ml. of aqueous methanolic sodium hydroxide solution (containing 20 percent by weight sodium hydroxide, 50 percent by volume methanol and 50 percent by volume water), diluted with water and diethyl ether and exhaustively extracted with diethyl ether. The ethereal phase is washed neutral, dried and evaporated to dryness. The residue is purified by adsorption on a 30-fold amount of silica gel [eluting agent: hexane/ethyl acetate (98:2 parts by volume)] to yield 6,9-dimethyl-deca-3,5,8-trien-2-one as a light-yellow oil of boiling point 130° C./mm. Hg.

EXAMPLE 22

An intensively stirred solution of 30 g. of 6,9-dimethyl-deca-5,6,8-trien-2-one in 100 ml. of hexane is treated at 0° C. with 10 g. of concentrated aqueous sulphuric acid. After 30 minutes, the resulting mixture is poured onto ice, neutralized with ice cold aqueous solution containing 20 percent by weight of sodium hydroxide and exhaustively extracted with diethyl ether. The ethereal extract is washed neutral, dried and evaporated. The resulting crude 4-(2,5,5 - trimethyl-cyclopent-1-en-1-yl)-but-3-en-2-one can be purified by distillation; boiling point=135° C./18 mm. Hg.

EXAMPLE 23

A solution of 17 g. of 4-(2,5,5-trimethyl-cyclopent-1-en-1-yl)-but-3-en-2-one in 200 ml. of benzene is heated under reflux conditions for 24 hours with 34 g. of carbethoxy-methylene-triphenylphosphorane and 6 g. of benzoic acid. The resulting mixture is poured into ice-water and diluted with diethyl ether. The organic phase is washed with aqueous solution containing percent by weight of sodium bicarbonate and water, dried and evaporated under reduced pressure. The residue is purified by adsorption on a 40-fold amount of silica gel [eluting agent:hexane/ethyl acetate (99:1 parts by volume)] to yield 5-(2,5,5-trimethyl - cyclopent-1-en-1-yl)-3-methyl-penta-2,4-dien-1-oic acid ethyl ester as a pale-yellow oil of boiling point 80° C./0.03 mm. Hg.

EXAMPLE 24

A solution of 5 g. of 5-(2,5,5-trimethyl-cyclopent-1-en-1-yl)-3-methyl penta-2,4-dien-1-oic acid ethyl ester in 50 ml. of tetrahydrofuran is treated at 10° C. with 0.6 g. of lithium aluminum hydride in 50 ml. of absolute tetrahydrofuran. The resulting mixture is stirred at 10° C. for 2 hours, cautiously treated with ethyl acetate and subsequently with water, and diluted with diethyl ether. The organic phase is washed neutral, dried and evaporated under reduced pressure. The residual crude 5-(2,5,5-trimethyl-cyclopent-1-en-1-yl)-3-methyl-penta - 2,4 - dien-1-ol is purified by adsorption on a 60-fold amount of aluminum oxide (basic, activity III) [eluting agent: hexane/ethyl acetate (3:1 parts by volume)].

EXAMPLE 25

A solution of 2 g. of 5-(2,5,5-trimethyl-cyclopent-1-en-1-yl)-3-methyl-penta-2,4-dien-1-ol in 700 ml. of methylene chloride is shaken with 100 g. of manganese dioxide at room temperature for 16 hours. The resulting mixture is filtered and the filtrate evaporated under reduced pressure. The residual crude 5-(2,5,5-trimethyl-cyclopent-1-en-1-yl)-3-methyl-penta-2,4-dien-1-al is purified by adsorption on a 40-fold amount of aluminum oxide (basic activity III) [eluting agent: hexane/ethyl acetate (4:1 parts by volume)].

EXAMPLE 26

A solution of 13 g. of (3-carboethoxy-2-methyl-prop-2-en-1-yl)-triphenylphosphonium chloride in 50 ml. of absolute ethanol is added with intensive stirring to a solution of 0.65 g. of sodium in 20 ml. of absolute ethanol. After 5 minutes, the resulting dark-yellow solution is rapidly treated with a solution of 4 g. of 5-(2,5,5-trimethyl-cyclopent-1-en-1-yl)-3-methyl-penta - 2,4 - dien-1-al in 15 ml. of absolute ethanol, stirred at room temperature for 4 hours and concentrated under reduced pressure. The residue is diluted with water and extracted with diethyl ether. The ethereal extract is washed neutral with water, dried and evaporated under reduced pressure. The residual crude 9-(2,5,5 - trimethyl-cyclopent-1-en-1-yl)-3,7-dimethyl-nona-2,4,6,8-tetraen-1-oic acid ethyl ester can be purified by adsorption on a 40-fold amount of silica gel [eluting agent: hexane/ethyl acetate (3:1 parts by volume)] absorption maximum (rectified spirit) as 350 nm.

$$(E_{1cm.}^{1\%}=1325)$$

EXAMPLE 27

3 g. of lithium metal are added in small portions to 200 ml. of liquid ammonia and the resulting suspension is stirred for 1 hour to yield a solution. Acetylene is bubbled through this solution until the blue color disappears, then the ammonia is evaporated off simultaneously with the dropwise addition of 200 ml. of 1:1 parts by volume mixture of absolute diethyl ether and tetrahydrofuran. The resulting solution is stirred at room temperature for 20 minutes, then treated dropwise over a period of 1 hour with a solution of 14 g. of 4-(2,5,5-trimethylcyclopent-1-en-1-yl)-but-3-en-2 one in 100 ml. of absolute diethyl ether/tetrahydrofuran (1:1 parts by volume), stirred at room temperature for 2 hours, poured into a mixture of ice and ammonium chloride and exhaustively extracted with diethyl ether. The ethereal extract is washed neutral, dried and evaporated to yield 5-(2,5,5-trimethyl-cyclopent-1-en-1-yl)-3-hydroxy-3 - methyl-pent-4-en-1-yne as a brownish oil.

EXAMPLE 28

22 g. of 5-(2,5,5-trimethyl-cyclopent - 1 - en-1-yl)-3-hydroxy-3-methyl-pent-4-en-1-yne are introduced with 30 g. of partially poisoned Lindlar catalyst and 3 ml. of quinoline into 1000 ml. of hexane and 100 ml. of methylene chloride and hydrogenated until hydrogen uptake ceases. The resulting mixture is filtered clear and washed well with water. The hexane phase is dried and evaporated. The residual yellow oil is purified by adsorption on a 60-fold amount of silica gel (eluting agent: benzene) to yield 5-(2,5,5-trimethyl-cyclopent-1-en-1-yl)-3-hydroxy-3-methyl-penta-1,4-diene as a light yellow oil.

EXAMPLE 29

A stirred solution of 30 g. of 5-(2,5,5-trimethyl-cyclopent - 1 - en-1-yl)-3-hydroxy-3-methyl-penta-1,4-diene in 100 ml. of absolute diethyl ether is treated at −10° C. with 35 g. of phosphorus tribromide, stirred at −5° C. for 1 hour, and poured into a mixture of ice and sodium bicarbonate. The ether layer is separated off, washed neutral, dried and cautiously evaporated almost to dryness under reduced pressure. The residual crude 5-(2,5,5-trimethyl-cyclopent-1-en-1-yl)-3-methyl-penta - 2,4 - dienyl bromide is immediately dissolved in 200 ml. of absolute benzene and the solution is treated with a solution of 40 g. of triphenylphosphine in 200 ml. of absolute benzene and stirred at room temperature for 24 hours. The precipitated [5-(2,5,5-trimethyl-cyclopent - 1 - en-1-yl)-3-methyl-penta-2,4-dien - 1 - yl]-triphenylphosphonium bromide is separated off by filtration.

EXAMPLE 30

5.3 g. of [5-(2,5,5-trimethyl-cyclopent - 1 - en-1-yl)-3-methyl-penta-2,4-dien - 1 - yl]-triphenylphosphonium bromide, 1.5 g. of ethyl 2-formyl-crotonate and 50 ml. of 1,2-butylene oxide are heated in a pressure vessel at 75° C. for 16 hours. The resulting solution is evaporated to dryness and the residue is taken up in 100 ml. of hexane and filtered from precipitated triphenylphosphine oxide. The filtrate is evaporated under reduced pressure and the residue purified by adsorption on a 50-fold amount of silica gel [eluting agent; hexane/ethyl acetate (3:1 parts by volume)] to yield 9-(2,5,5-trimethyl-cyclopent - 1 - en-1-yl)-3,7-dimethyl-nona-2,4,6,8-tetraen - 1 - oic acid ethyl ester displaying an absorption maximum in ethanol at 351 nm.

$(E_{1\,cm.}^{1\%} = 1330)$

EXAMPLE 31

A solution of 2 g. of 9-(2,5,5-trimethyl-cyclopent-1-en-1-yl)-3,7-dimethyl-nona-2,4,6,8-tetraen - 1 - oic acid ethyl ester in 30 ml. of ethanol is stirred with 2 g. of potassium hydroxide for 1 hour at 60° C. (bath temperature). The resulting mixture is poured into ice-water and extracted with diethyl ether. The aqueous phase is made slightly acidic with aqueous 3 N sulphuric acid and exhaustively extracted with diethyl ether. The ethereal extract is washed neutral, dried and evaporated under reduced pressure. The residual 9-(2,5,5-trimethyl-cyclopent-1-en-1-yl)-3,7-dimethyl-nona-2,4,6,8-tetraen-1-oic acid is recrystallized from methanol or hexane/tetrahydrofuran; adsorption maximum (rectified spirit) at 348 nm.

$(E_{1\,cm.}^{1\%} = 1330)$

EXAMPLE 32

1 g. of solid sodium bicarbonate is added to a solution of 3.0 g. of 9-(2,5,5-trimethyl-cyclopent-1-en-1-yl)-3,7-dimethyl-nona-2,4,6,8-tetraen-1-oic acid in 40 ml. of absolute benzene and the mixture is treated at 5° C. with 5 ml. of pure phosphorus trichloride. The resulting mixture is brought to room temperature and, after 1 hour, the benzene phase is decanted off. The resulting benzene solution of the acid chloride is added dropwise with stirring at 5° C. to a solution of 18 g. of isobutylamine in 200 ml. of absolute benzene. The resulting mixture is treated with 500 ml. of water and the organic phase is separated off, dried and evaporated to yield 9-(2,5,5-trimethyl-cyclopent - 1 - en-1-yl)-3,7-dimethyl-nona-2,4,6,8-tetraen-1-oic acid isobutyl amide as yellow crystals which can be recrystallized from high boiling petroleum ether; absorption maximum (in ethanol) at 345 nm.

$(E_{1\,cm.}^{1\%} = 1435)$

EXAMPLE 33

2 g. of solid sodium bicarbonate are added to a solution of 2.8 g. of 9-(2-acetyl-5,5-dimethyl-cyclopent-1-en-1-yl)-3,7-dimethyl-nona-2,4,6,8-tetraen - 1 - oic acid in 50 ml. of absolute benzene and the mixture is treated at 3°–5° C. with 5.6 ml. of pure phosphorus trichloride. Without further cooling, the mixture is stirred for 1 hour, then filtered. The resulting solution of the acid chloride is immediately combined with a cold (ca 0° C.) solution of 15 g. of ethylamine in absolute tetrahydrofuran. The mixture is stirred at 0°–5° C. for 30 minutes, diluted with water and exhaustively extracted with diethyl ether. The ether phase is dried and evaporated to yield 9-(2-acetyl-5,5-dimethyl - cyclopent - 1 - en-1-yl)-3,7-dimethyl-nona-2,4,6,8-tetraen-1-oic acid ethyl amide which can be purified by recrystallization from diethyl ether/hexane; absorption maximum (in ethanol) at 380 nm.

$(E_{1\,cm.}^{1\%} = 1650)$

EXAMPLE 34

After the the addition of 70 ml. of absolute methanol, 2 g. of 9-(2-acetyl-5,5-dimethyl - cyclopent-1-en-1-yl)-3,7-dimethyl-nona-2,4,6,8-tetraen-1-oic acid are treated portionwise with a total of 3 g. of sodium borohydride. The resulting mixture is stirred at room temperature for 90 minutes, then poured into ice-water and extracted with diethyl ether. The ether extract is discarded and the aqueous phase is acidified with dilute sulphuric acid and exhaustively extracted with diethyl ether. The ether extract is washed neutral with saturated aqueous sodium chloride solution, dried over sodium sulphate and concentrated under reduced pressure. The 9-(2-ethyl-5,5-dimethyl-cyclopent-1-en-1-yl) - 3,7-dimethyl-nona-2,4,6,8 - tetraen-1-oic acid which precipitates from the concentrate as yellow crystals melts at 152°–154° C. after recrystallization from ethanol.

EXAMPLE 35

2 g. of solid sodium bicarbonate are added to a solution of 2.8 g. of 9-(2-acetyl-5,5-dimethyl-cyclopent-1-en-1-yl)-3,7 - dimethyl-nona-2,4,6,8 - tetraen-1-oic acid in 50 ml. of absolute benzene and the mixture is treated at 3°–5° C. with 5.6 ml. of pure phosphorus trichloride. Without further cooling, the mixture is stirred for 1 hour, then filtered. The resulting solution of the acid chloride is immediately combined with a cold (ca 0° C.) solution of 12 g. of morpholine in absolute tetrahydrofurane. The mixture is stirred at 5° C. for 45 minutes diluted with water and exhaustively extracted with ether. The ether phase is dried and evaporated to yield 9-(2-acetyl-5,5-dimethyl-cyclopent-1-en-1-yl) - 3,7 - dimethyl-nona-2,4,6,8-tetraen-1-oic acid morpholide which can be purified by recrystallization from tetrahydrofurane/hexane. Absorption maximum (in ethanol) at 379 nm.

$E_{1\,cm.}^{1\%} = 1545$

Examples 36–39 illustrate typical pharmaceutical preparations containing the polyene compounds provided by the invention.

EXAMPLE 36

A solution containing 0.1% active ingredient is made up of 0.1 g. of 9-(2-acetyl-3,5-dimethyl-cyclopent-1-en-1-yl) - 3,7 - dimethyl-nona-2,4,6,8-tetraen-1-oic acid, 70.0 g. of 94% ethanol and propylene glycol q.s. to 100.0 ml.

EXAMPLE 37

A capsule-fill mass containing 0.3% active ingredient is made up of 0.3 g. of 9-(2-acetyl-5,5-dimethyl-cyclopent-1-en-1-yl) - 3,7 - dimethyl-nona-2,4,6,8-tetraen-1-oic acid, 51.7 g. of wax mixture, 103.0 g. of vegetable oil and 0.5 g. of the trisodium salt of ethylenediaminetetraacetic acid.

EXAMPLE 38

An ointment containing 0.3% active ingredient is made up of 0.3 g. of 9-(2-acetyl - 5,5-dimethyl-cyclopent-1-en-1-yl)-3,7-dimethyl - nona - 2,4,6,8-tetraen-1-oic acid, 2.7 g. of cetyl alcohol, 6.0 g. of lanolin, 15.0 g. of white petroleum jelly and distilled water q.s. to 100.0 g.

EXAMPLE 39

A water/fat emulsion containing 0.3% active substance is made up of 0.3 g. of 9-(2-acetyl-5,5-dimethyl-cyclopent-1-en-1-yl) - 3,7 - dimethyl-nona-2,4,6,8-tetraen-1-oic acid, 2.0 g. of magnesium stearate and 13.0 g. of perhydrosqualene.

What is claimed is:
1. A compound of the formula

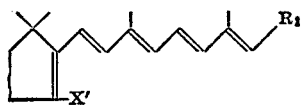

wherein X' is ethyl, methyl, 1-hydroxyethyl, acetyl or acetyl with its oxo group protected as a hydrolyzable ketal; and $R_1$ is carboxyl, or lower alkoxycarbonyl.

2. The compound of claim 1 wherein $R_1$ is carboxyl.

3. The compound of claim 2 wherein said compound is 9-[2-acetyl - 5,5 - dimethyl-cyclopent - 1 - en-1-yl]-3,7-dimethyl-nona-2,4,6,8-tetraen-1-oic acid.

4. The compound of claim 2 wherein said compound is 9-[2-ethyl - 5,5 - dimethyl - cyclopent - 1 - en-1-yl]-3,7-dimethyl-nona-2,4,6,8-tetraen-1-oic acid.

5. The compound of claim 2 wherein said compound is 9-[2,5,5 - trimethyl - cyclopent - 1 - en - 1 - yl] - 3,7-dimethyl-nona-2,4,6,8-tetraen-1-oic acid.

6. The compound of claim 1 wherein $R_1$ is lower alkoxycarbonyl.

7. The compound of claim 6 wherein said compound is 9-[2-acetyl - 5,5 - dimethyl-cyclopent - 1 - en-1-yl]-3,7-dimethyl-nona-2,4,6,8-tetraen-1-oic acid ethyl ester.

8. The compound of claim 6 wherein said compound is 9-[2,5,5 - trimethyl - cyclopent - 1 - en - 1 - yl] - 3,7-dimethyl-nona-2,4,6,8-tetraen-1-oic acid ethyl ester.

No references cited.

ALEX MAZEL, Primary Examiner
J. H. TURNIPSEED, Assistant Examiner

U.S. Cl. X.R.

260—243, 247.2, 268, 247.7, 296, 326.8, 327, 340.9, 413, 468, 476, 488, 514, 557, 586, 611, 612, 617; 424—305, 320, 278